Nov. 8, 1927. Re. 16,783

C. C. JANTZEN

BATHING SUIT

Original Filed Nov. 12, 1920

Inventor.
Carl C. Jantzen,
By Arthur E. Wallace
Atty.

Reissued Nov. 8, 1927.

Re. 16,783

UNITED STATES PATENT OFFICE.

CARL C. JANTZEN, OF PORTLAND, OREGON, ASSIGNOR TO JANTZEN KNITTING MILLS, A CORPORATION OF OREGON.

BATHING SUIT.

Original No. 1,390,135, dated September 6, 1921, Serial No. 423,587, filed November 12, 1920. Application for reissue filed October 19, 1925. Serial No. 63,541.

This invention relates to wearing apparel, such as bathing suits, and more particularly to one piece bathing suits.

The primary object of the invention is directed to a novel design for a bathing suit which will not bind the body and which permits freedom of movement.

Another object of the invention is the provision of a one piece union bathing garment wherein the back of the garment is so designed as to allow freedom and comfort to the body and at the same time present a neat, close fitting suit conforming to the accepted styles of this type of garment.

Another object of the invention relates to an unique design of bathing suit including a novel form of gusset which allows freedom of the body and will not bind or draw on the trunks of the suit when wet.

With these objects in view and others which will be manifest and suggested as the nature and purpose of the invention are revealed in the following specification and in the attached drawing wherein I have shown a practical and the preferred embodiment of the invention:—

Similar numerals in the specification refer to like and corresponding parts on the drawing.

Figure 1:
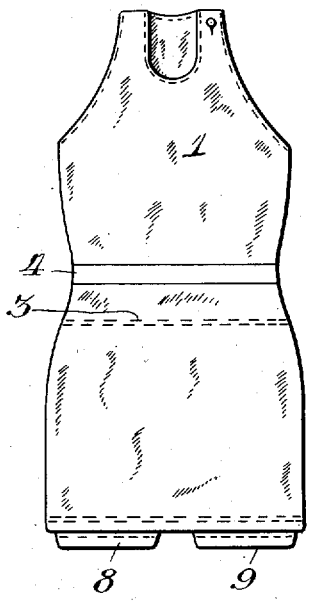
Figure 1 is a front view of the garment.
Figure 3:
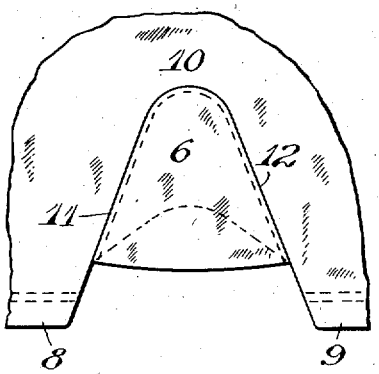
Figure 3 is a rear portion of the trunks.

Numeral 1 designates the body and numeral 2 the trunks of a union garment. The latter are made of elastic, closely woven material permitting the same to be stretched in all its parts, and therefore, the trunks 2 are adjustable to any form and do not sag when wet. The body and trunk portions, 1 and 2, of the garment are sewed together on the dotted line 3, just below the waist line 4, as is clearly shown in Figure 1 of the drawing.

Figure 2:
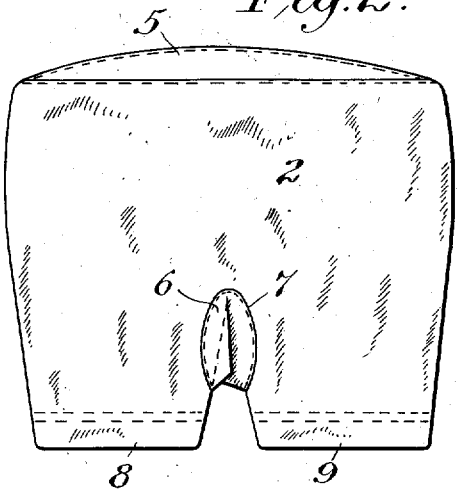
Figure 2 is a front view of the trunk portion of the garment.
Figure 4:
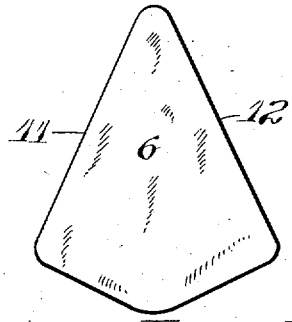
Figure 4 is a detached view of the gusset.

Referring now to Figure 2, it will be seen that the back of the trunks 2 are made longer than the front and are cut in a semi-circular pattern as indicated at 5. This pattern gives the bathing trunks 2 sufficient fullness in the back to permit freedom of the body and consequently does not bind the person, a common objection of modern designs of bathing suits. The binding is more pronounced when the trunks 2 are affixed to a body 1 to provide a one-piece suit. It will of course be understood that the width of the semi-circular portion 5 will vary with the size of the suit or trunks but in all instances, this portion of the trunks will allow for the necessary pull on the garment incident to distortions of the body while swimming or engaging in other strenuous exercise.

The gusset indicated at 6 is stitched at 7 to the leg portions 8, 9 and the seat 10 of the trunks 2. It is to be observed that the rear sides 11 and 12 of the gusset are substantially twice the length of the front portion thereof. This allows for freedom of the wearer's body and prevents binding in the seat portion of the trunks. Due to the elasticity of the material, the gusset 6 and the semi-circular portions 5 of the trunks, permit perfect freedom of the body without pull on the garment. In all instances, however, the garment will cling to the body, but will not bind in the seat or back, and this is true when the garment is wet or dry.

In the accompanying drawings, I have illustrated my invention embodied in one form by way of example this being a so-called one piece bathing suit. In practice, this garment has been found to be highly satisfactory in obtaining the results hereinabove set forth. It will be obvious, however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

I claim:—

1. In a one piece bathing garment of the class described, a body, a trunk portion attached thereto, the rear waist line of said trunk portion being cut along a curved line and stitched to the body whereby the rear of the trunk portion is longer than the front thereof, and a substantially triangular gusset twice the length at the rear of the garment than at the front thereof and stitched to the trunk portion to allow for binding in the seat and back of the garment due to distortion of the body.

2. In a one piece bathing garment of the class described, a body, a trunk portion attached thereto, the rear waist line of said trunk portion being cut along a curved line and stitched to the body whereby the rear of the trunk portion is longer than the front thereof, and both front and back sewed in a straight line which provides fullness in the back, and a substantially triangular gusset twice the length at the rear of the garment than at the front thereof and stitched to the trunk portion to allow for binding in the seat and back of the garment due to distortion of the body.

CARL C. JANTZEN.